United States Patent [19]

Nola

[11] Patent Number: 4,459,528

[45] Date of Patent: Jul. 10, 1984

[54] PHASE DETECTOR FOR THREE-PHASE POWER FACTOR CONTROLLER

[75] Inventor: Frank J. Nola, Huntsville, Ala.

[73] Assignee: The United States of America as represented by the Administrator of the National Aeronautics and Space Administration, Washington, D.C.

[21] Appl. No.: 450,166

[22] Filed: Dec. 16, 1982

[51] Int. Cl.³ .............................................. H02P 1/26
[52] U.S. Cl. .................................... 318/729; 318/809; 323/300
[58] Field of Search ................ 318/719, 438, 798–811; 363/74, 149; 323/212, 217, 300

[56] References Cited

U.S. PATENT DOCUMENTS

| 4,052,648 | 10/1977 | Nola | 318/729 |
| 4,379,258 | 4/1983 | Sagimoto | 318/805 |
| 4,384,243 | 5/1983 | Muskovac | 318/809 |
| 4,388,578 | 6/1983 | Green et al. | 318/829 |
| 4,404,511 | 9/1983 | Nola | 318/729 |

FOREIGN PATENT DOCUMENTS

WO80/02895 12/1980 PCT Int'l Appl. ................. 318/729

Primary Examiner—G. Z. Rubinson
Assistant Examiner—Arthur G. Evans
Attorney, Agent, or Firm—J. H. Beumer; J. R. Manning; L. D. Wo-ford, Jr.

[57] ABSTRACT

A phase-detector (16, 18, 20) is provided for use in a power factor controller for a three-phase induction motor. The power factor controller includes switching thyristors (10, 12 14) for each motor phase winding and the phase detector for each phase includes an operational amplifier (36) which senses the current phase angle for that phase by sensing the voltage across the phase thyristor. Common mode rejection is achieved by providing positive feedback between the input and output of the voltage sensing operational amplifier.

8 Claims, 20 Drawing Figures

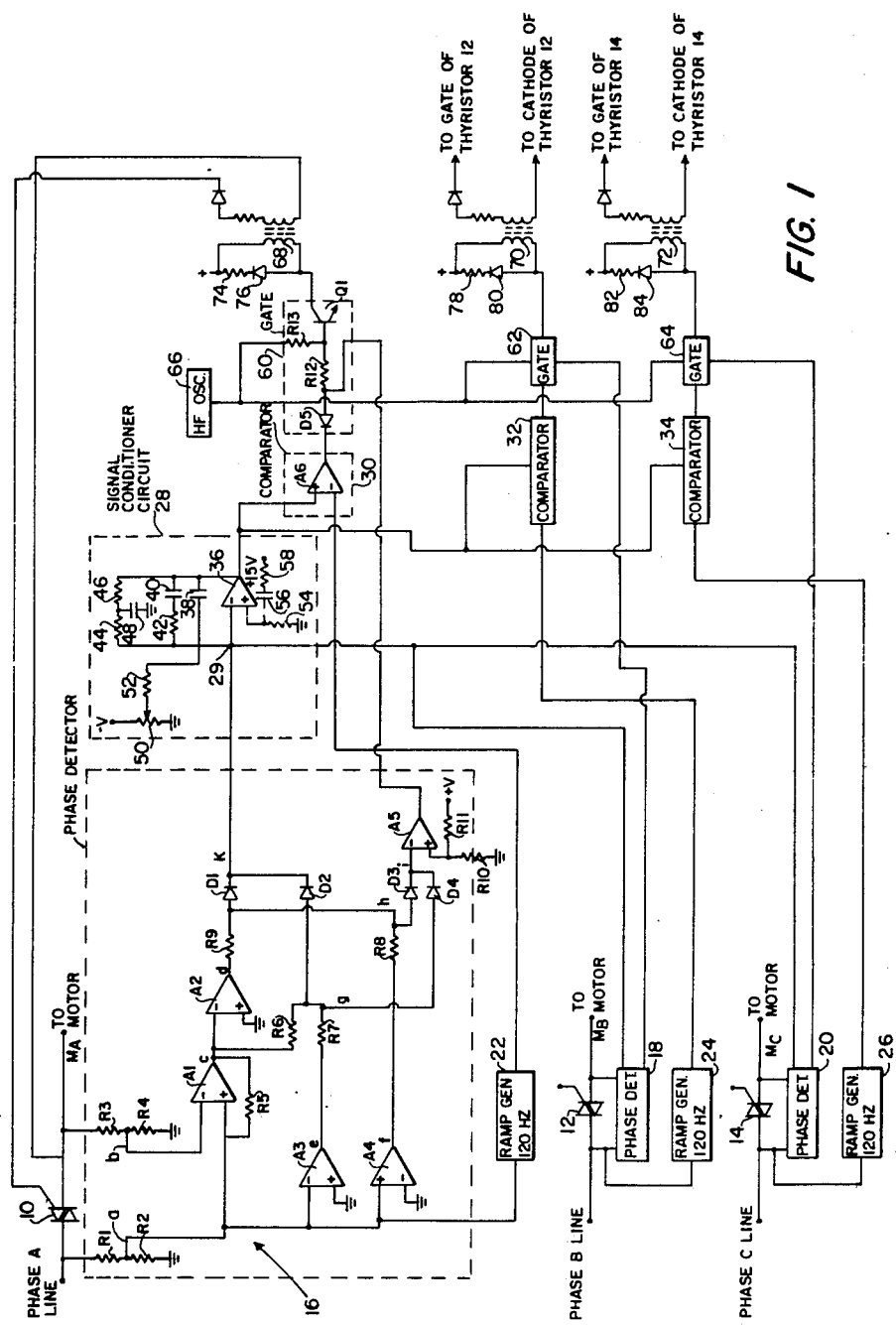

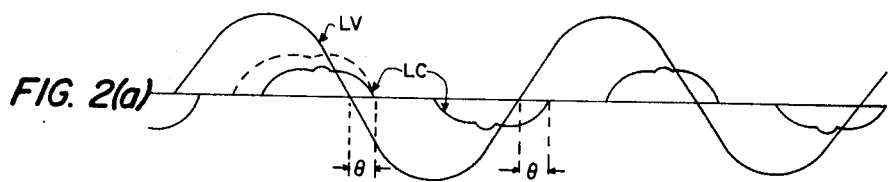
FIG. 2(a)
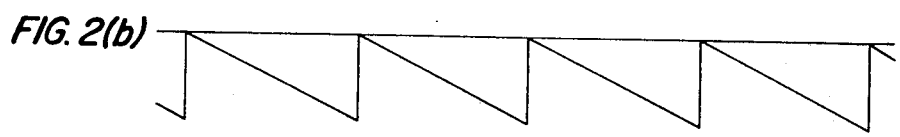
FIG. 2(b)
FIG. 2(c)
FIG. 2(d)
FIG. 2(e)
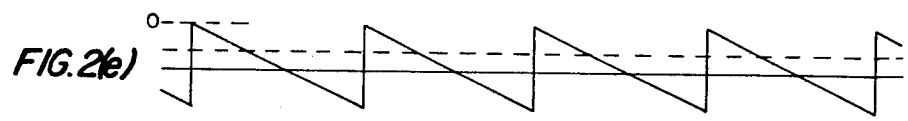
FIG. 2(f)
(FIRING ANGLE)
FIG. 2(g)
← time →

PHASE DETECTOR FOR THREE-PHASE POWER FACTOR CONTROLLER

ORIGIN OF THE INVENTION

The invention described herein was made by an employee of the United States Government and may be manufactured and used by or for the government of the United States of America for governmental purposes without the payment of any royalties thereon or therefor.

TECHNICAL FIELD

This invention relates generally to power input control systems for induction motors, and more particularly to a phase detector for a three-phase power factor type motor controller.

BACKGROUND ART

In the U.S. Pat. No. 4,052,648 (Nola), entitled "Power Factor Control System for A.C. Induction Motors", there is disclosed a power reduction system for induction motors in which the operating power factor of a motor is controlled as a function of the difference between a commanded power factor signal and the operating power factor, through control of a thyristor connected to the motor.

As will appear, the present invention is applicable to power factor controllers (PFC) of this general type, or to other systems of this type, which require the measurement of the phase angle of current flow with respect to the line voltage in a threephase, three-wire system. Other schemes have been disclosed which use either current or voltage transformers to measure the current, or use optical couplers to sense the thyristor voltage while providing the required isolation. These approaches are both expensive and are sensitive to the amplitude of the current. This latter disadvantage does not necessarily hinder the phase measurement itself, but does raise the cost of manufacture by making it necessary to stock components of various sizes. A third approach achieves isolation by using a separate power supply for each phase. Since the phase information from each phase has to be summed in a common amplifier in the PFC, optical couplers (or equivanet isolators) are still required. Again, this is obviously an expensive technique. In addition, all of the above approaches require two conventional zero crossing detectors (typically formed by operational amplifiers and associated resistors) per phase to obtain a square wave and the inverse of the square wave as synchronized with the current flow.

In U.S. Patent Application Ser. No. 199,675 (Nola), a single phase PFC is disclosed wherein the phase angle of the current is measured by sensing the voltage across the thyristor. This same technique is applicable to a three-phase PFC as well. However, in the single phase, one side of the thyristor is connected to the same ground reference as the low level circuitry power supply. By simply connecting one input of the operational amplifier to ground and the other input to the high side of the thyristor through appropriate resistors, the voltage across the thristor can be sensed. However, this technique as applied to three-phase sensing requires that a high common mode voltage be rejected or ignored by the operational amplifiers. This problem, and the solution provided by the present invention, are discussed in more detail hereinbelow.

SUMMARY OF THE INVENTION

In accordance with the invention, a phase detector is provided for use in a power factor controller of the type described above which overcomes the problem discussed above and which, in particular, provides rejection of the high common mode voltage which produces this problem. Thus, according to a preferred embodiment thereof, the invention comprises an improvement in a three-phase power factor controller for a three-phase induction motor of the type comprising a plurality of electronic switching means (e.g. a thyristor device such as a triac or a pair of oppositely poled silicon controlled rectifiers) individually connected between the respective phase terminals of a three-phase supply line and the corresponding phase windings of the motor; phase detector means for detecting the motor voltage and current in each phase and for detecting the motor voltage and current in each phase and for producing, for each phase, an output proportional to the phase difference between the motor voltage and current; summing means for summing the outputs of the outputs of the phase detector means; power factor commnad signal generating means for generating a power factor command signal; and control means, responsive to the output of the summing means and to the power factor command signal, for controlling switching of the switching means. The individual phase detector means of the controller each include means, comprising an operational amplifier whose inputs are connected across the corresponding electronic switching means for that phase, for sensing the current phase angle for that phase by sensing the voltage across the corresponding switching means, and generally speaking, the invention concerns the provision of means providing positive feedback between the output and input of the operational amplifier such that switching of the output of the operational amplifier is synchronized with switching of the voltage across the electronic switching means. This feedback means preferably comprises a resistor connected between the output and input of the operational amplifier.

In a specific, presently preferred embodiment, a second, inverting operational amplifier is connected to the output of the first mentioned operational amplifier. Further, third and fourth operational amplifiers are connected in parallel to the line side of the electronic switching means, the output of the third operational amplifier being connected through a resistor to a first junction and the output of the second operational amplifier being connected through a resistor to a second junction between the output of the first operational amplifier and the first junction. The first junction is also connected through a diode to the output of the second operational amplifier and the second junction is connected through a diode to the output of the second operational amplifier. The controller further comprises a ramp generator for each phase, a comparator for each phase for comparing the output of the summing means with the ramp generator output for each phase, and a fifth operational amplifier being connected through respective diodes to the first and second junctions.

Preferably, the inputs of the first mentioned operational amplifier are respectively connected to line and motor sides of the electronic switching means through voltage dividers for dividing down the corresponding voltages to operational amplifier compatible levels.

Other features and advantages of the invention will be set forth in, or apparent from, the detailed description of a preferred embodiment thereof which follows.

BRIEF DESCRIPTION OF THE DRAWINGS

FIG. 1 is a schematic circuit diagram, partially in block form, of a three-phase power factor controller incorporating a phase detector in accordance with a preferred embodiment of the invention;

FIGS. 2(a) to 2(g) are waveforms used in explanation of the operation of the overall system.

DESCRIPTION OF THE PREFERRED EMBODIMENTS

Figure 3A:
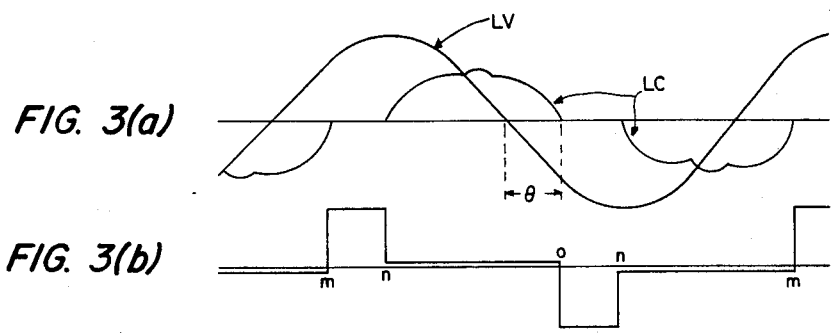
FIGS. 3 (a) to 3 (l) are waveforms used in explanation of the operation of the phase detector of the invention.

Referring to FIG. 1, there is shown a power factor controller phase detector constructed in accordance with a preferred embodiment of the present invention, as incorporated in three-phase power factor controller of the type disclosed in my earlier filed U.S. patent application Ser. No. 199,765, filed on Oct. 23, 1980 and in U.S. Pat. No. 4,052,648 referred to therein. This patent and application are hereby incorporated by reference. Because the overall system is described in some detail in the application referred to above, the description here of the overall system will be relatively brief, and reference is made to that application for details of the overall system.

In the system of FIG. 1, the phases of a threephase motor (not shown), are connected to motor inputs terminals $M_A$, $M_B$, and $M_C$ and through corresponding silicon control rectifier (SCR) devices 10, 12, and 14, to the line phase terminals A, B, C of a three power line, which typically provides 220 or 440 volts, 60 cycle, A.C. from these terminals.

Three phase detectors 16, 18 and 20 are each connected to receive a first signal proportional to the respective phase currents from motor terminals $M_A$, $M_B$; and $M_C$, respectively, and a second signal proportional to the respective phase voltages from terminals A, B, C, respectively. These phase detectors each produce an output signal proportional to the current-voltage phase differential in each of the three phases. The circuitry employed in each of the phase detectors is that illustrated in FIG. 1 for phase detector 16 and this circuitry is described below.

The line phase terminals A, B, and C are also connected to three ramp generators 22, 24, 26 associated with respective phase detectors 16, 18 and 20.

One output of each phase detector 16, 18 and 20 is connected to a signal conditioner circuit 28 whose single output forms the input for respective comparators 30, 32 and 34. Phase conditioning circuit 28 is described in some detail in Ser. No. 199,765 and includes an operational amplifier 36 whose inverting input is connected to receive the control signals from the phase detectors. Circuit 28 also includes three inverse feedback circuits connected between the output and input of the operational amplifier 36, one consisting of a capacitor 38, and one consisting of a capacitor 40 connected in series with a resistor 42 and one consisting of a pair of resistors 44 and 46 and an intermediate capacitor 48 connected to ground. Capacitor 38 provides a low pass filter for smoothing the square wave feedback control signal while capacitors 40 and 48 and resistors 42, 44 and 46 provide a lead-lag-lead network required in stabilizing the closed loop control signal. The potentimeter 50, connected through a resistor 52 to the feedback network, provides a power factor command signal which is negatively biassed to provide a difference or subtraction signal with respect to the positive signals developed at the outputs of phase detectors 16, 18 and 20. A resistor 54 is connected between the non-inverting input of operational amplifier 36 and ground, and a capacitor 56 and resistor 58 are connected to a +15 voltage supply terminal.

The ramp generators 22, 24 and 26 are respectively connected to the other inputs of comparators 30, 32 and 34 and the individual outputs of these comparators form an input to each of three gate circuits 60, 62 and 64. A further input for the respective gates is provided from the individual phase detectors 16, 18 and 20 while a third input is provided from a high frequency generator 66. Gates 60, 62, 64 are electronic switches and operate to effect gating of the high frequency signal from high frequency oscillator 66 through the primary windings of respective transformers 68, 70 and 72 to the corresponding thyristors.

The outputs of gates 60, 62 and 64 are respectively connected to transformers 68, 70 and 72. Each transformer is shunted by the combinations of a resistor 74 and a diode 76, a resistor 78 and a diode 80 and a resistor 82 and a diode 84. The resistor-diode combinations are connected atross the respective transformer primaries to suppress inductive voltages.

Turning now to a consideration of phase detector 16 of FIG. 1, phase detector 16 includes a first pair of padding resistors R1 and R2 which are connected to Phase A line voltage terminal A. The junction "a" between the resistors R1 and R2 is connected to the positive input of a first operational amplifier A1. A second pair of padding resistors R3 and R4 are connected to motor terminal $M_A$ and the junction "b" between this resistor pair is connected to the negative input of operational amplifier A1.

The output, denoted "c", of operational amplifier A1 is connected to the negative input of a second operational amplifier A2 whose output, denoted "d", is connected through a resistor R9 and a diode D1 to a junction point 29 of signal conditioner circuit 28. A resistor R5 is connected between the + input and output of amplifier A1.

Junction point "a" between resistor R1 and R2 is also connected to the negative input of a third operational amplifier A3 and to the positive input of a fourth operational amplifier A4. The output "e" of operational amplifier A3 is connected through a resistor R7 to a junction point between a resistor R6 and a diode D2, the latter being connected to junction 29. That resistor-diode junction point is also connected through a diode D4 to the negative input of a fifth operational amplifier A5. The output "f" of operational amplifier A4 is connected through a resistor R8 to the junction between resistor R9 and diode D1, and through a diode D3 to the same negative input of operational amplifier A5. The positive input of operational amplifier A5 is connected through a first resistor R10 to ground and through a second resistor R11 to a positive supply terminal.

Turning now to the make-up of the comparators and gates used in the system, comparator 30, as illustrated, comprises a operational amplifier A6 while gate 60 comprises a diode D5, resistors R12 and R13 and a transistor Q1, connected as shown.

The output of operational amplifier A5 is connected to the junction between diode D5 and resistor R12 of gate 60. Ramp generator 22 is connected to the negative input of operational amplifier A6 of comparator 30, while the output of signal conditioner circuit 28 is connected to its positive input.

Before considering the function and operation of the phase detector of the invention in more detail, the overall operation of the basic system will be considered in connection with FIGS. 2(a) to 2(f). The line voltage LV is shown for phase A in FIG. 2(a), along with corresponding line (or motor) current LC, for a partially-loaded, phase-controlled motor. The other two line voltages and currents are, of course, identical but shifted 120 degrees as in any typical three phase system. The output of the ramp generator 22 is in synchronism with the respective line voltage therefor and is shown in FIG. 2(b). It is noted that a full wave ramp is required for a triac or for the two SCR antiparallel scheme illustrated.

The output of phase detector 16 is shown in FIG. 2(c) and it noted that the average value is positive. The output frequency of each phase detector is 120 HZ and when the three outputs are summed together at 29, this combined frequency is 360 HZ as shown in FIG. 2(g) since the outputs are each space 120° apart. This is the feedback signal, and three-phase, full-wave feedback is required to achieve the bandwidth required for stability. The feedback signal shown in FIG. 1(g) is filtered by operational amplifier 36 and capacitor 38 to produce the error voltage shown in FIG. 2(d).

Potentiometer 50, through resistor 52, commands the desired phase angle. Operational amplifier 36 sums the command and feedback signals and the output thereof varies to vary the applied motor voltage as the load changes.

Referring to FIG. 2(f), the two inputs to comparator 30, i.e., the ramp and error signals, are shown superimposed. When the error signal equals or intersects the ramp signal, the comparator 30 switches positive. This determines the firing angle or turn on point of the appropriate thyristor 10. When comparator 30 switches positive, the output thereof is blocked by diode D5 of gate 60 which allows high frequency oscillator 66 to drive transistor Q1. Transistor Q1 switches the transformer 68, and turns on the thyristor 10. Of course, the same operation occurs in the other two phases with the timing thereof being shifted 120° corresponding to the phase in question. When the output of comparator 30 is negative, diode D5 does not block this output. The ohmic value of resistor R12 is smaller than that of resistor R13 so that the base of transistor Q1 will be held negative. Thus, transistor Q1 will be non-conductive and the thyristors will he held off.

It is noted that the negative voltage −V from potentiometer 50 tends to cause the output of operational amplifier 36 to go positive. This positive input to the comparators 30, 32 and 34 makes the comparator outputs go positive. This allows the corresponding transistors, i.e., Q1 in the case of comparator 30, to switch and turn on the corresponding thyrisors. Conversely, the feedback signal illustrated in FIG. 2(g) is a positive going signal and therefore tends to turn the thyristors off. The command voltage −V from potentiometer 70 is nulled by the positive feedback voltage through the action of operational amplifier 36. The output thereof will vary as the load changes to provide nulling of the command voltage and feedback signal.

The system in equilibrium is shown in FIG. 2(a). An increase in load tends to cause the phase angle $\theta$ to decrease. If $\theta$ decreases then the widths of the output pulses of the phase detectors 16, 18 and 20 decreases (see FIGS. 2(c) and 2(g)). This results in less positive voltage being fed back to summing point 29. The command voltage provided by potentiometer 50 now has the greater effect and causes the output of operational amplifier 36 to go more positive. This output signal intersects the ramp voltage at a higher point on the ramp and increases the firing angle, thereby increasing the voltage applied to the motor. This is shown in dotted lines in FIGS. 2(a) and 2(f).

Because of the high gain of operational amplifier 36 as determined by the circuitry associated therewith, when the phase angle $\theta$ varies only an infinitesimal amount the output of operational amplifier 36 is caused to vary over the entire range thereof to control the motor voltage from full on at heavy loads to some nominal voltage at idle.

Considering the operation of the invention in connection with a standard 240 volt line-to-line system, the line voltage to signal ground is 240 divided by $\sqrt{3}$, or about 140 volts. The peak value is $140\sqrt{2}$, or about 200 volts. To be compatible with the standard operational amplifiers, this voltage is padded down by resistors R1 and R2 by a factor of 20 so that the voltage at point "a" is typically 10 volts peak with respect to neutral. Similarly, resistors R3 and R4 pad the voltage on the ohter side of the thyristors 10 by a factor of 20 at point "b". When the thyristors 10 are off, there is a 200 peak difference across the device. Correspondingly, point "a" swings 10 volts higher than point "b" and amplifier A1 has no problem in switching in synchronism with this voltage. However, when the thyristors 10 are "on" and conducting current, the voltage across the device is typically only 1 volt. Hence, while the line side has a peak value of 200 volts, the motor side has a peak value of 199 volts. This 1 volt difference must be detected and the 199 volt common mode rejected. If the resistors R1, R2, R3 and R4 were perfect in value so that each resistor pad was exactly 20 to 1, point "a" would be at 10.0 volts and point "b" at 9.950 or 50 millivolts lower. This is adequate to cause operational amplifier A1 to switch in synchronism with the voltage across the thyristors. However, the resistors are not perfect and for the sake of economy, typically have a 1% tolerance. Thus, under worse case conditions, point "b" could actually be 4% higher than point "a", with point "a" being at 9.8 volts and point "b" at 10.2−0.05 volts. Since the common mode error of 0.4 volts from resistor tolerances is much greater than the 0.05 volts of desired signal, operational amplifier A1 will not switch in synchronism with voltage across thyristors 10.

This operation is perhaps best understood in connection with FIG. 3(a) to 3(e) and, in which, FIGS. 3(a), like FIG. 2(a), shows the line voltage. In order to detect the phase of the current, the output of amplifier A1, illustrated in FIG. 3(d), must switch in synchronization with the thyristor voltage shown in FIG. 3(b), the current and voltage being shown in FIG. 3(a) as noted above. The problem described above is eliminated by the connection of resistor R5 between the output of amplifier A1 and the positive input thereof. This is positive feedback which forces amplifier A1 to remain latched in the proper polarity during that portion of time when the thyristors 10 are on. Resistor R5 has a value which will typically feed 0.5 volts from the output of amplifier A1 back to the positive input thereof as determined by the ratio of the value of resistor R5 to that of resistor R2.

Figure 3B:
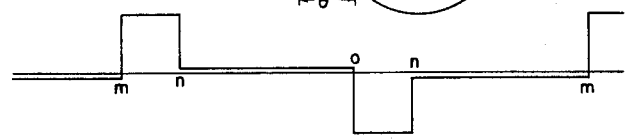

Referring to FIG. 3(b), at points "o" and "m," the thyristors turn off and the voltage across the device rises rapidly. This voltage is equal to the line voltage minus the motor voltage and typically will be greater than 50 volts. The voltage at point "a" in FIG. 1 will be 200/20 or 10 volts and will be 200–50/20 or 7.5 volts at point "b." This 2.5 volts difference is greater than the 0.5 volts being fed back from amplifier A1 and causes amplifier A1 to switch positive as indicated in FIG. 3(d). The thyristors switch on at "n" and during the interval "n" to "o" (or "n" to "m"), their voltage drop is low (typically 1 volt) as indicated in FIG. 3(b). During this interval, there can be as much as 0.40 volts of common mode error across the input of amplifier A1 due to resistor mismatch. This voltage, however, cannot switch amplifier A1 negative. In this regard, amplifier A1 is switched positive at "m" and during the interval "n" to "o," is held latched in the positive direction by the +0.5 volts being supplied to the positive input thereof from the output of A1. At point "o" the thyristors again turn off and the large rise in negative voltage is more than sufficient to overcome the +0.5 volts of positive feedback and switch amplifier A1 negative. Further, amplifier A1 will remain negative until being once again switched positive at "m." Thus, amplifier A1 switches in synchronism with the voltage across the thyristors as indicated in FIG. 3(d).

Figure 3C:
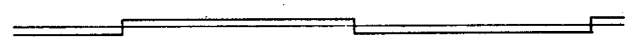
Figure 3D:
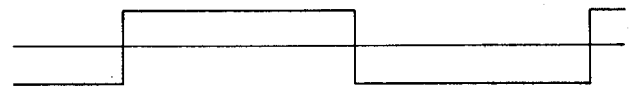
Figure 3E:
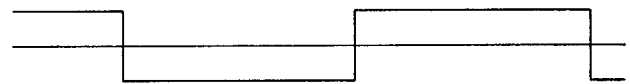
Figure 3F:
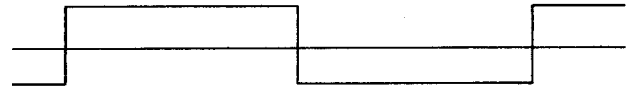
Figure 3G:
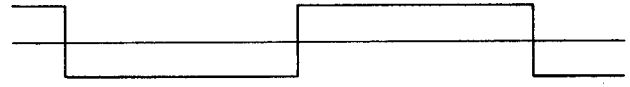
Figure 3H:
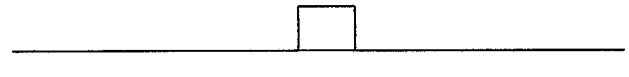
Figure 3I:
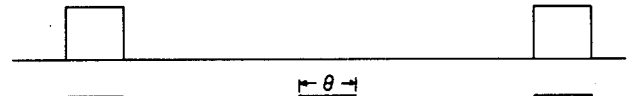
Figure 3J:
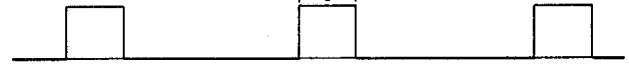

Referring now to FIG. 3(c) which shows the voltage across the thyristors where conduction is allowed for 100% of the time period. Under this circumstance, there is no large voltage rise across the thyristors and hence, the voltage difference between points "a" and "b" is not sufficient to cause amplifier A1 to switch in synchronization with thyristor voltage. Thus, amplifier A1 remains latched either in a positive or negative polarity state. Although this has no serious consequence in the power factor controller of the invention, it may in other systems, and can easily be avoided.

It will be appreciated from FIG. 1 that the output of amplifier A1 is inverted by amplifier A2 (see FIG. 3 (e)). Further, the line voltage detected at point "a" is zero detected and squared by operational amplifier A4 and is inverted and squared by operational amplifier A3. The corresponding outputs "c" and "e" of amplifier A1 and A3, respectively, are summed through resistors R6 and R7 to provide the output "g" whose waveform is shown in FIG. 3 (h). Similarly, the outputs "d" and "f" of amplifiers A2 and A4, respectively, are summed through resistors R8 and R9 to provide an output "h" whose waveform is shown in FIG. 3(i). Outputs "g" and "h" are "OR"ed by diodes D1 and D2 at point "k" to provide the phase angle feedback of one phase of the PFC. This signal is shown in FIG. 3(j). This identical signal is used here to prevent the thyristors from turning on to 100% dury cycle an so doing, insures that sufficient voltage remains across the thyrisors to switch amplifier A1 in synchronization with this signal.

Figure 3K:
Figure 3L:

Referring again to FIG. 3 (b), if the firing angle "n" is advanced to correspond with "m", the thyristor is 100% conductive and the current flow provided will be continuous. There is no need to advance the firing angle beyond "m" since current flowing from the preceeding half cycle holds the thyristors in the "on" state. It is noted that the periods when there is no need to fire the thyristors correspond to the phase angle representative signal illustrated in FIG. 3(j). This signal is reproduced at point "i" in FIG. 1, i.e., the input to amplifier A5, by "OR" ing the signals at points "g" and "h" using diodes D3 and D4. As shown in FIG. 3(k), the output of amplifier A5 is normally positive because of the positive bias provided to the plus input thereof by the voltage divider formed by resistors R10 and R11. During the interval $\theta$ (see FIGS. 3(a) and 3(j)), the voltage at the inverting input of amplifier A5 exceeds this bias and causes amplifier A5 to switch negative (see FIG. 3(k)). The output of amplifier A5 is connected between diode D5 and resistor R12 of gate 60 and is "OR"ed with the output of comparator 30. Since comparator 30 inhibits the drive to the thyristors when its output is low, a low output of amplifier A5 also inhibits the thyristors from turning on. The thyristor cannot be fired on until amplifier A5 switches positive at point "p" shown in FIG. 3(k). Due to the finite switching speeds of the amplifiers, point "p" actually occurs later (typically 10 to 20 microseconds) than the thyristor turn off point "m" and "o" (FIG. 3(b)). Hence, the thyristor cannot be fired on 100%, but remains off for the short periods shown in FIG. 3(l). This small off time has insignificant effect on full load motor performance but allows the voltage across the thyristors to rise to a level sufficient to overcome the latching bias applied to amplifier A1 and to cause switching thereof in synchronization with the thyristor voltage.

All of the above is, of course, repeated for the B phase and C phase of the motor.

As noted, the thyristors referred to above may be either triacs or anti-parallel (oppositely poled) SCRs as illustrated and the specific embodiment illustrated is applicable to line voltages higher or lower than 240 volts.

Although the invention has been described in detail with respect to an exemplary embodiment thereof, it will be understood by those of ordinary skill in the art that variations and modifications may be effected in this embodiment within the scope and spirit of the invention.

I claim:

1. In a three-phase power factor controller for a three-phase induction motor of the type comprising a plurality of electronic switching means individually connected between the respective phase terminals of a three-phase supply line and the corresponding phase windings of the motor; phase detector means for producing, for each phase, an output proportional to the phase difference between the motor voltage and current; summing means for summing the outputs of said phase detector means; power factor command signal generating means for generating a power factor command signal; and control means, responsive to the output of said summing means and to said power factor command signal, for controlling switching of said switching means, each said phase detector means including means, comprising an operational amplifier whose inputs are connected across the corresponding electronic switching means for that phase, for sensing the phase angle between the current for that phase and the line voltage by sensing the voltage across said corresponding electronic switching means, the improvement comprising means providing positive feedback between the output and input of said operational amplifier such that switching of the output of the operational amplifier is synchronized with switching of the voltage across the electronic switching means.

2. A three-phase power factor controller for a three-phase induction motor as claimed in claim 1 wherein said feedback means comprises a resistor connected between said output and input.

3. A three-phase power factor controller for a three-phase induction motor as claimed in claim 2 wherein each said electronic switching means comprises a triac.

4. A three-phase power factor controller for a three-phase induction motor as claimed in claim 2 wherein each said electronic switching means comprises a pair of oppositely poled silicon controlled rectifiers connected in parallel.

5. A three-phase power factor controller for a three-phase induction motor as claimed in claim 1 further comprising a second, inverting operational amplifier connected to the output of the first mentioned operational amplifier.

6. A three-phase factor controller for a three-phase induction motor as claimed in claim 5 further comprises third and fourth operational amplifiers connected in parallel to the line side of electronic switching means, the output of said third operational amplifier being connected through a resistor to a first junction, and the output of said second operational amplifier being connected through a resistor to a second junction, a further resistor being connected between the output of the first operational amplifier and said first junction, said first junction being connected through a diode to a point connected to the output of said second amplifier, said controller further comprising a ramp generator for each phase, a comparator for each phase for comparing the output of said summing means with the ramp generator output for each phase, and a fifth operational amplifier having an output connected to the output of said comparator, one input of said fifth operational amplifier being connected through respective diodes to said first and second junctions.

7. A three-phase power factor controller for a three-phase induction motor as claimed in claim 6 wherein the inputs of the first mentioned operational amplifier are respectively connected to the line and motor sides of said electronic switching means through voltage dividers for dividing down the voltages on the line and voltage sides to operational amplifier compatible levels.

8. A three-phase power factor controller for a three-phase induction motor as claimed in claim 1 wherein the inputs of the first mentioned operational amplifier are respectively connected to line and motor sides of said electronic switching means through voltage dividers for dividing down the corresponding voltages to operational amplifier compatible levels.

* * * * *